(12) United States Patent
Frishman

(10) Patent No.: US 9,749,636 B2
(45) Date of Patent: Aug. 29, 2017

(54) DYNAMIC ON SCREEN DISPLAY USING A COMPRESSED VIDEO STREAM

(71) Applicant: INTEL CORPORATION, Santa Clara, CA (US)

(72) Inventor: Yaniv Frishman, Kiryat Ono M (IL)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 14/739,682

(22) Filed: Jun. 15, 2015

(65) Prior Publication Data

US 2016/0119624 A1    Apr. 28, 2016

Related U.S. Application Data

(60) Provisional application No. 62/068,263, filed on Oct. 24, 2014.

(51) Int. Cl.
| | | |
|---|---|---|
| *H04N 19/136* | (2014.01) | |
| *H04N 19/167* | (2014.01) | |
| *H04N 19/176* | (2014.01) | |
| *H04N 19/44* | (2014.01) | |
| *H04N 5/44* | (2011.01) | |
| *H04N 5/445* | (2011.01) | |
| *H04N 21/426* | (2011.01) | |
| *H04N 21/475* | (2011.01) | |
| *H04N 21/482* | (2011.01) | |
| *H04N 21/485* | (2011.01) | |
| *H04N 19/27* | (2014.01) | |

(52) U.S. Cl.
CPC ......... *H04N 19/136* (2014.11); *H04N 5/4401* (2013.01); *H04N 5/44582* (2013.01); *H04N 19/167* (2014.11); *H04N 19/176* (2014.11); *H04N 19/27* (2014.11); *H04N 19/44* (2014.11); *H04N 21/42653* (2013.01); *H04N 21/4753* (2013.01); *H04N 21/482* (2013.01); *H04N 21/4852* (2013.01); *H04N 5/44504* (2013.01)

(58) Field of Classification Search
CPC .. H04N 19/136; H04N 19/167; H04N 19/176; H04N 19/44; H04N 5/4401; H04N 21/482; H04N 19/27; H04N 21/4852; H04N 21/42653; H04N 21/4753; H04N 5/44582
See application file for complete search history.

(56) References Cited

U.S. PATENT DOCUMENTS

| | | | |
|---|---|---|---|
| 8,483,389 B1 | 7/2013 | Masterson et al. | |
| 2004/0028142 A1 | 2/2004 | Kim | |
| 2008/0267277 A1 | 10/2008 | Huang et al. | |
| 2010/0104021 A1* | 4/2010 | Schmit | H04N 19/00151 375/240.24 |
| 2010/0177820 A1* | 7/2010 | Chono | H04N 19/196 375/240.03 |

(Continued)

FOREIGN PATENT DOCUMENTS

WO    96-38008 A1    11/1996

OTHER PUBLICATIONS

International Search Report and Written Opinion for PCT US2015/051898, mailed Jan. 20, 2016, 9 pages.

*Primary Examiner* — Neil Mikeska
(74) *Attorney, Agent, or Firm* — Jordan IP Law, LLC

(57) ABSTRACT

Systems, apparatus, articles, and methods are described below including operations for dynamic on screen display using a compressed video stream.

21 Claims, 10 Drawing Sheets

(56) References Cited

U.S. PATENT DOCUMENTS

| | | | |
|---|---|---|---|
| 2012/0224640 A1* | 9/2012 | Sole Rojals | H04N 19/124 375/240.18 |
| 2013/0279598 A1 | 10/2013 | Gomes | |
| 2014/0132616 A1* | 5/2014 | Han | G09G 5/399 345/547 |
| 2014/0301462 A1* | 10/2014 | Gu | H04N 19/159 375/240.12 |

* cited by examiner

RECEIVE A COMPRESSED VIDEO STREAM INCLUDING AT LEAST ONE COMPRESSED ON SCREEN DISPLAY IMAGE ASSOCIATED WITH DYNAMIC MACROBLOCK LOCATION DATA
502

RECEIVE NON-COMPRESSED DYNAMIC CONTENT ASSOCIATED WITH THE ON SCREEN DISPLAY IMAGE
504

COMBINE THE NON-COMPRESSED DYNAMIC CONTENT INTO THE COMPRESSED ON SCREEN DISPLAY VIDEO STREAM
506

DECOMPRESS THE COMBINED COMPRESSED ON SCREEN DISPLAY IMAGE AND NON-COMPRESSED DYNAMIC CONTENT
508

DISPLAY THE DECOMPRESSED ON SCREEN DISPLAY IMAGE OF THE ON SCREEN DISPLAY USER INTERFACE INCLUDING THE STATIC CONTENT AS WELL AS THE DYNAMIC CONTENT
510

DYNAMIC ON SCREEN DISPLAY USING A COMPRESSED VIDEO STREAM

RELATED APPLICATIONS

The present application claims the benefit of U.S. Provisional Application No. 62/068,263, filed 24 Oct., 2014, and titled "DYNAMIC ON SCREEN DISPLAY USING A COMPRESSED VIDEO STREAM", the contents of which are expressly incorporated herein in their entirety.

BACKGROUND

A video encoder compresses video information so that more information can be sent over a given bandwidth. The compressed signal may then be transmitted to a receiver that decodes or decompresses the signal prior to display.

Previous solutions for generating on screen display (OSD) images typically use software (SW) or hardware (HW), which may update a frame buffer, which then may be displayed.

For example, in some conventional solutions to the problem, the on screen display (OSD) image to display may be first written in to a frame buffer. Then, the constructed image may be scanned out and displayed. This means that such conventional systems must include storage for a frame buffer, which is large and typically stored in a separate, expensive, DDR memory chip. In addition, such conventional systems must include a display engine, which can scan out the frame buffer in order to display it. Hence, such conventional systems may require a more complex hardware implementation and a large storage area for the frame buffer, and therefore cost more.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 5 is a flow diagram illustrating an example video coding process;

DETAILED DESCRIPTION

Figure 1:
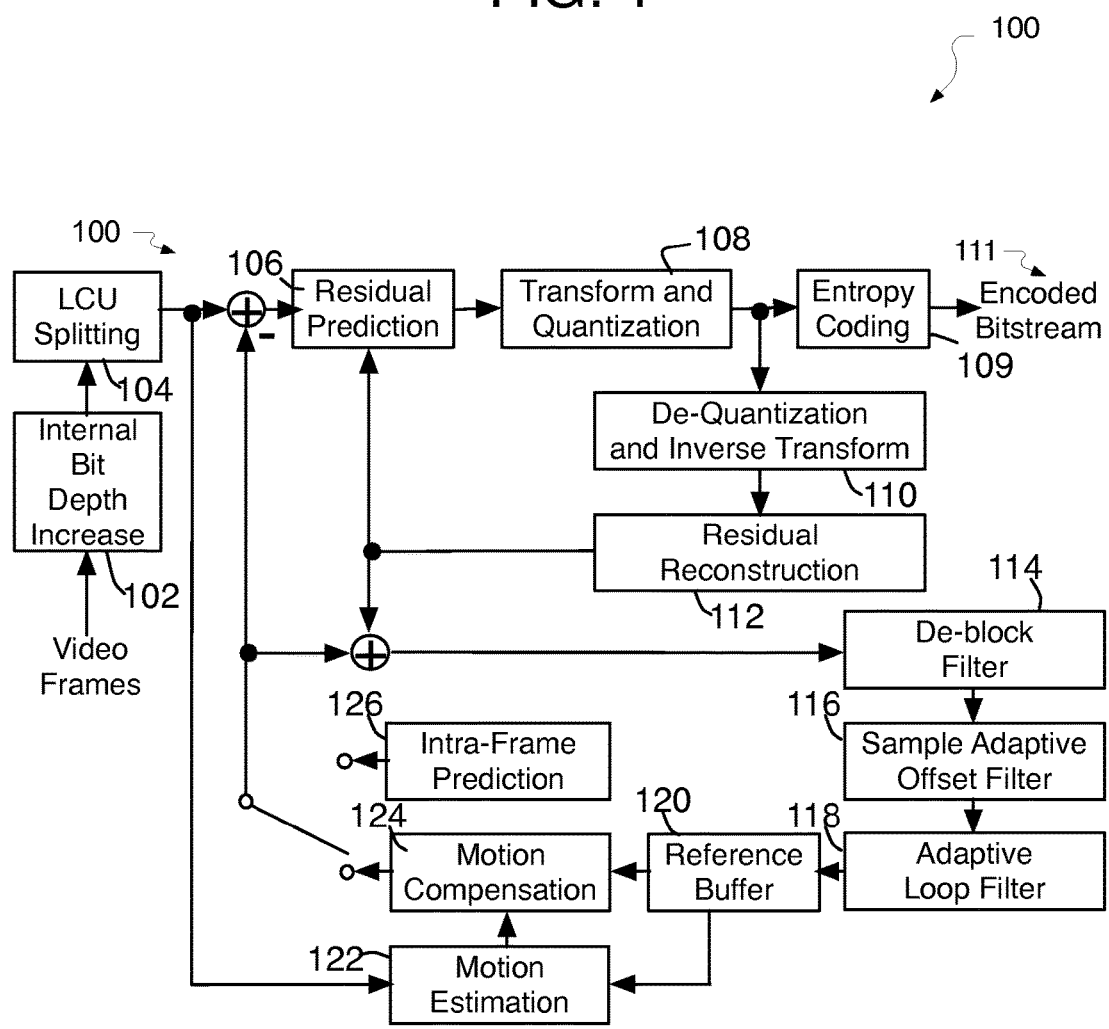
FIG. 1 is an illustrative diagram of an example video processing system.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for dynamic on screen display using a compressed video stream.

As described above, previous solutions for generating on screen display (OSD) images typically use software (SW) or hardware (HW), which may update a frame buffer, which then may be displayed.

As used herein, the term "on-screen display" and/or "OSD" may refer in generally to a user interface (e.g., an "OSD user interface") utilizing a static content image (e.g., an "OSD image") that may be presented on a monitor either by itself or superimposed on an underlying screen picture. Such an OSD user interface may be commonly used by modern television sets, VCRs, DVD players, set-top boxes, and/or the like to display information such as volume, channel, and time. Similarly, an OSD user interface may include dynamic content, such as when the volume is changed, a pin number is entered, and/or the like.

For example, in some conventional solutions to the problem, the on screen display (OSD) image to display may be first written in to a frame buffer. Then, the constructed image may be scanned out and displayed. This means that such conventional systems must include storage for a frame buffer, which is large and typically stored in a separate, expensive, DDR memory chip. In addition, such conventional systems must include a display engine, which can scan out the frame buffer in order to display it. Hence, such conventional systems may require a more complex hardware implementation and a large storage area for the frame buffer, and therefore cost more.

As will be described in more detail below, instead of using a frame buffer, some of the implementations described herein may utilize a video decoder as part of the system to decode and display the OSD image.

For example, some of the implementations described herein may address the problem of displaying a variable content on screen display (OSD) image in a system, which may contain a video decoder but may not contain a frame buffer. A sample use case is a WiGig wireless display system, or the like.

In contrast to conventional solutions, some of the implementations described herein may re-use an existing video decoder, which may already be part of the system, in order to display on screen display (OSD) images. Accordingly, instead of storing and manipulating an uncompressed image, a compressed bitstream, which contains the image, may be used.

Additionally, some the implementations described herein deal with the concept of adding content generated in runtime into a compressed stream. For example, a video stream may be assembled where the fixed content (e.g., an OSD image) may be compressed, while the content that needs to be changed (e.g., dynamic content) in runtime (e.g. a random PIN code) may be encoded as I_PCM macroblocks.

Further, in order to save space in non-volatile memory carrying the OSD images, the OSD images are usually compressed (e.g. using JPEG). While in existing systems, a second decoder may need to be included in the system for decoding the compressed OSD image before copying it into the frame buffer, some implementations described herein make use of the already available video decoder. Accordingly, some implementations described herein may reuse the existing wireless display decoder for OSD content to eliminate the complexity and associated cost (e.g. in code storage and/or HW) of additional HW/SW for decoding compressed OSD images (e.g., using the $2^{nd}$ decoder).

FIG. 1 is an illustrative diagram of an example video coding system 100, arranged in accordance with at least some implementations of the present disclosure. In various implementations, video coding system 100 may be configured to undertake video coding and/or implement video codecs according to one or more advanced video codec standards.

Further, in various embodiments, video coding system 100 may be implemented as part of an image processor, video processor, and/or media processor and may undertake inter prediction, intra prediction, predictive coding, and/or the like in accordance with the present disclosure.

As used herein, the term "coder" may refer to an encoder and/or a decoder. Similarly, as used herein, the term "coding" may refer to encoding via an encoder and/or decoding via a decoder. For example video encoders and video decoders as described herein (e.g., see FIG. 9) may both be examples of coders capable of coding.

In some examples, video coding system 100 may include additional items that have not been shown in FIG. 1 for the sake of clarity. For example, video coding system 100 may include a processor, a radio frequency-type (RF) transceiver, a display, and/or an antenna. Further, video coding system 100 may include additional items such as a speaker, a microphone, an accelerometer, memory, a router, network interface logic, etc. that have not been shown in FIG. 1 for the sake of clarity.

In some examples, during the operation of video coding system 100, current video information may be provided to an internal bit depth increase module 102 in the form of a frame of video data. The current video frame may be split into Largest Coding Units (LCUs) at module 104 and then passed to a residual prediction module 106. The output of residual prediction module 106 may be subjected to known video transform and quantization processes by a transform and quantization module 108. The output of transform and quantization module 108 may be provided to an entropy coding module 109 and to a de-quantization and inverse transform module 110. Entropy coding module 109 may output an entropy encoded bitstream 111 for communication to a corresponding decoder.

Within the internal decoding loop of video coding system 100, de-quantization and inverse transform module 110 may implement the inverse of the operations undertaken by transform and quantization module 108 to provide the output of residual prediction module 106 to a residual reconstruction module 112. Those skilled in the art may recognize that transform and quantization modules and de-quantization and inverse transform modules as described herein may employ scaling techniques. The output of residual reconstruction module 112 may be fed back to residual prediction module 106 and may also be provided to a loop including a de-blocking filter 114, a sample adaptive offset filter 116, an adaptive loop filter 118, a buffer 120, a motion estimation module 122, a motion compensation module 124 and an intra-frame prediction module 126. As shown in FIG. 1, the output of either motion compensation module 124 or intra-frame prediction module 126 is both combined with the output of residual prediction module 106 as input to de-blocking filter 114, and is differenced with the output of LCU splitting module 104 to act as input to residual prediction module 106.

As will be described in more detail below, instead of using a frame buffer, some of the implementations described herein may utilize a video decoder as part of the system to decode and display the OSD image. For example, some of the implementations described herein may address the problem of displaying a variable content on screen display (OSD) image in a system, which may contain a video decoder but may not contain a frame buffer. A sample use case is a WiGig wireless display system, or the like.

In some examples, in some of the implementations described herein a compressed bit stream, which contains the onscreen display image, may be generated. Then, the bit stream may be fed in a continuous loop to the decoder. In order to present dynamic content such as numbers and letters, uncompressed macro blocks (e.g., an I_PCM) may be used.

In contrast to conventional solutions, some of the implementations described herein may re-use an existing video decoder, which may already be part of the system, in order to display on screen display (OSD) images. Accordingly, instead of storing and manipulating an uncompressed image, a compressed bitstream, which contains the image, may be used.

As will be discussed in greater detail below, video coding system 100 may be used to perform some or all of the various functions discussed below in connection with FIGS. 3-8.

Figure 2:
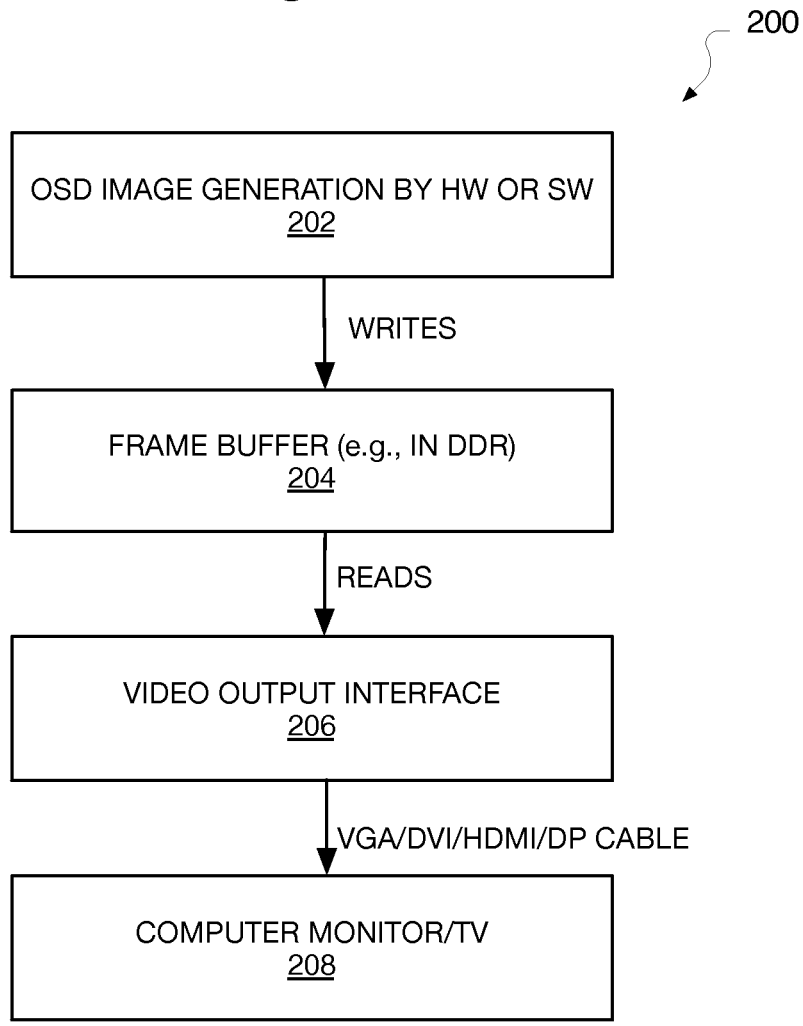
FIG. 2 is an illustrative diagram of an example Prior Art video processing scheme.

FIG. 2 is an illustrative diagram of an example Prior Art video processing scheme 200, arranged in accordance with at least some Prior Art implementations. Some current on screen display implementations may look like those depicted in FIG. 2.

Scheme 200 may include one or more operations, functions or actions as illustrated by one or more of operations 202, etc.

First, at operation 202, HW or SW may be used to render/write the required OSD image into a frame buffer. Rendering means setting the color of each pixel in the image in order to get the desired result.

Next, at operation 204, the generated image may be scanned/read out to a video output interface.

Next, at operation 206, a cable is used to connect the system generating the OSD to a computer monitor or TV for display at operation 208.

As will be discussed in greater detail below, in contrast to conventional solutions, some of the implementations described herein may re-use an existing video decoder, which may already be part of the system, in order to display on screen display (OSD) images. Accordingly, instead of storing and manipulating an uncompressed image, a compressed bitstream, which contains the image, may be used.

Figure 3:
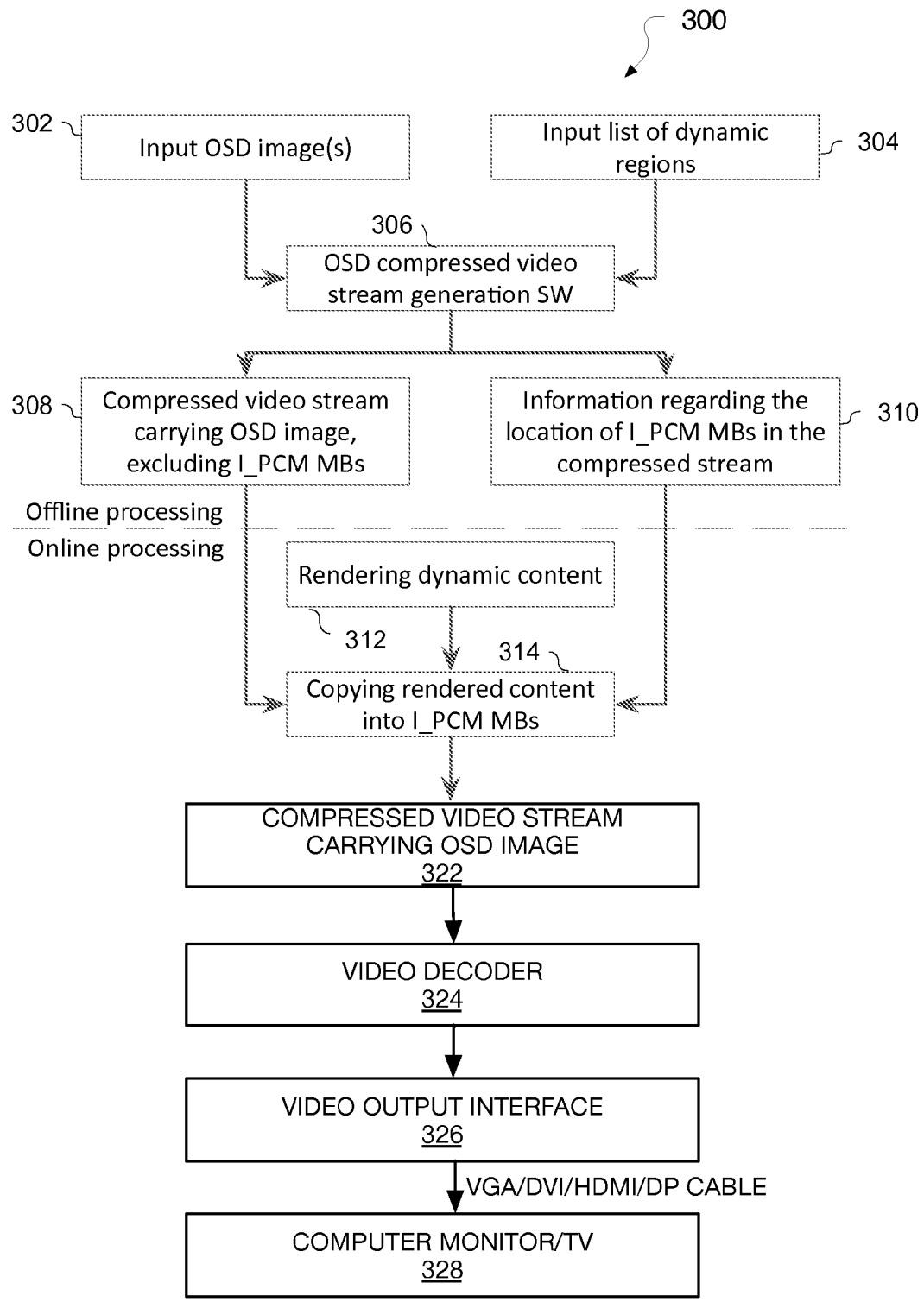
FIG. 3 is an illustrative diagram of an example video processing scheme.

FIG. 3 is an illustrative diagram of an example video processing scheme 300, arranged in accordance with at least some implementations of the present disclosure. In various implementations, video processing scheme 300 may perform operations on a compressed bit stream, which contains the onscreen display image. The bit stream may be fed in a continuous loop to the decoder.

Scheme 300 may include one or more operations, functions or actions as illustrated by one or more of operations 302, etc.

The steps below, e.g., operations 302-310, describe operations that are typically done offline, (e.g., during the manufacturing stage of the product) to generate a compressed video stream that carries the OSD image.

At operation 302, input OSD image(s) may be obtained. Such input images are the images that the system is required to display, e.g. an image with the text "welcome to wireless docking" (this is an example of static content) or the like depending on the particular OSD user interface being used.

At operation 304, an input list of dynamic regions may be obtained. Such an input list of dynamic regions may include a list of areas in the image that will include dynamic content, and therefore may use I_PCM MBs in some implementations.

Video compression SW (e.g., OSD compressed video stream generation SW 306) may take the input image as well as the list of regions, which need to use I_PCM MBs and generate a compressed video stream 308 (e.g., a compressed video stream in the format that the decoder will be able to decode).

One item of note here is that the compressed video stream 306 may not include the actual dynamic content (e.g., does not include I_PCM MBs). This is done since I_PCM MBs are large (since they are not compressed), making the stream, which is to be stored in non-volatile memory, large (requiring a large and expensive non-volatile memory).

What may be done instead is that the I_PCM MBs may be deleted by OSD compressed video stream generation SW 306 from the stream intended for storage in the non-volatile memory, and instead additional meta-data 310 may be created by OSD compressed video stream generation SW 306 (e.g., information regarding the location of I_PCM MBs in the compressed stream 310). Using this meta-data 310 it may be known where to insert I_PCM MBs into the stream fed to the decoder.

The steps below, e.g., operations 312-328, describe the online process, which may done when the product embodying an implementation described herein needs to display the OSD image.

At operation 312, the dynamic content may be rendered (e.g., assigning a value (color) to each pixel). This can be done, for example, by storing glyphs for each one of the numbers/letters wanted to be displayed, and then copying the colors from the glyph to the buffer storing the rendering result.

At operation 314, the rendered content may be copied into the I_PCM MBs. This may be done by reading (from non-volatile memory) the compressed video stream carrying the OSD image plus the metadata (e.g., information regarding the location of I_PCM MBs in the compressed stream) and placing the rendered pixels into the correct location in the video stream. This may result in the final video stream, "compressed video stream carrying OSD image including dynamic content 322", being output.

Next, at operation 324, this video stream 322 (containing one image) may be fed into a video decoder. Such a video decoder may be a pre-existing video decoder in a given coding system (e.g., a video decoder used in a wireless display sink/wireless docking system). As discussed, this video stream 322 (containing one image) may be re-fed in a loop to the decoder 324.

Next, at operation 326-328, the decoded pixels may be outputted over a video interface 326 and/or displayed on a computer monitor or TV 328.

In contrasting a conventional solution of FIG. 2 with the implementation of FIG. 3, video coding scheme 300 may re-use an existing video decoder, which may already be part of the system, in order to display on screen display (OSD) images. Accordingly, instead of storing and manipulating an uncompressed image, a compressed bitstream, which contains the image, may be used.

In operation, for example, video decoders typically expect a stream of packets, corresponding to a sequence of video frames. In order to repetitively display the same image, the following steps are typically done. First, a compressed packet stream, which corresponds to a single video frame, (e.g., the OSD image to be shown) may be created. For example, this can be done offline for static (fixed) content, or dynamically as explained below. Next, the packet stream may be fed into the decoder in a loop. For example, after the decoder 324 reads all of the packets, the stream may be fed again to the decoder 324. For example, in a typical video decoder, it may be necessary to update the presentation time carried in the stream, so the decoder will be willing to re-decode the same packets and display the same image again. Optionally, the decoder 324 can be modified in order to accept packets whose presentation time is in the past. Note that it might be required to update (e.g., increment) packet sequence numbers in order to fool the decoder 324 to think new packets arrived. When it is time to display a different OSD image, a new packet stream corresponding to the new image may replace the first packet stream, and re-decoding in a loop resumes.

As will be discussed in greater detail below, in some cases it may be necessary to display dynamic content (e.g., content which can be generated only during system run time). An example is a PIN code used for authentication between wireless docking sources and sinks. Such content can be generated by using I_PCM macro blocks (MBs) in the stream fed to the decoder 324. An I_PCM MB may contain uncompressed pixel values. This may allow software (SW) to easily render the required dynamic content. In some implementations, in order to simplify the process, glyphs containing letters and numbers may be stored as I_PCM MBs. For example, each glyph may be built out of a matrix of 2 by 3 I_PCM MBs. Software (SW) may then assemble the glyphs in the correct order according to the content to be displayed.

As will be discussed in greater detail below, video coding scheme 300 may be used to perform some or all of the various functions discussed below in connection with FIGS. 5 and/or 8.

Figure 4:
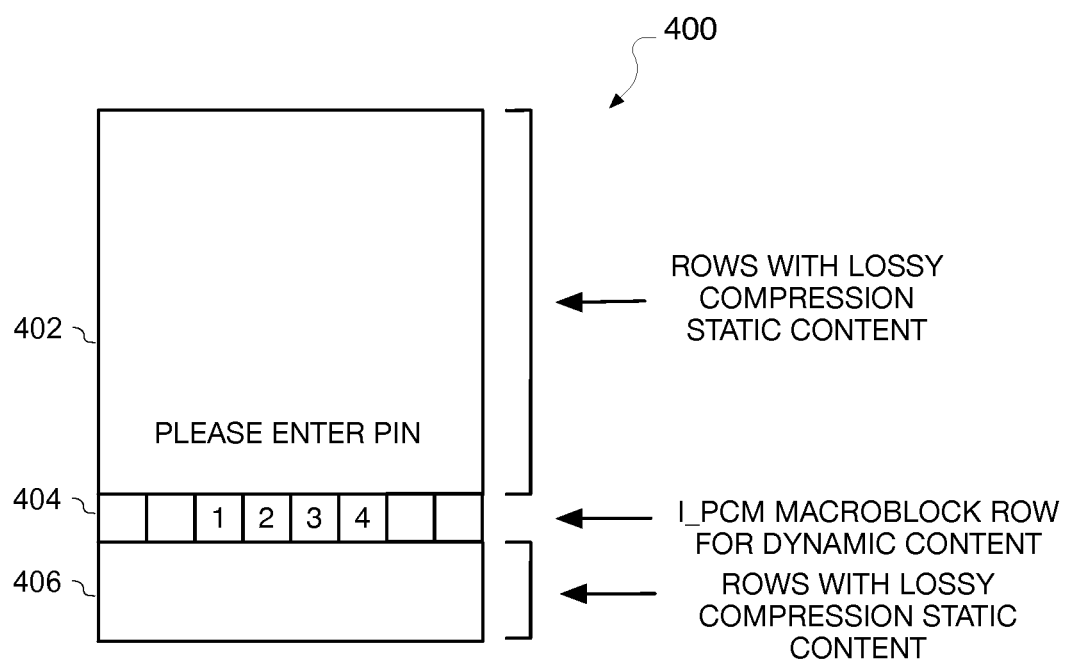
FIG. 4 is an illustrative diagram of an example video screen.

FIG. 4 is a diagram illustrating an example video screen 400, arranged in accordance with at least some implementations of the present disclosure. An example of such a display of dynamic content is shown in FIG. 4.

As discussed above, as used herein, the term "on-screen display" and/or "OSD" may refer in generally to a user interface 400 (e.g., an "OSD user interface") utilizing a static content image 402/406 (e.g., an "OSD image") that may be presented on a monitor either by itself or superimposed on an underlying screen picture. Such an OSD user interface 400 may be commonly used by modern television sets, VCRs, DVD players, set-top boxes, and/or the like to display information such as volume, channel, and time. Similarly, an OSD user interface may include dynamic content 404, such as when the volume is changed, a pin number is entered, and/or the like.

In the illustrated example, OSD user interface 400 may be composed of a fixed, lossy compressed top part OSD image static content 402 with the string "Please enter pin" (or the like). Then comes a dynamic content field 404, illustrated here as a data entry row (e.g., I_PCM MB row), where dynamic content (e.g., the number 1234) may be rendered (e.g., one MB per digit in the example). This an example of the "dynamic content" discussed herein. Below, another region of lossy compressed, OSD image static content 406 is shown.

Note that other, more elaborate implementations are possible, e.g., storing the glyphs as lossy compressed MBs, the like, and/or combinations thereof.

Similarly, the OSD image static content 402/406 and/or dynamic content field 406 may take many forms depending on the type of OSD user interface 400 employed. For example, OSD user interface 400 may be implemented for volume change, pin number entry (as illustrated here), channel change, user ID entry, password entry, search interface, the like, and/or combinations thereof.

As will be discussed in greater detail below, screen 400 may be used to perform some or all of the various functions discussed below in connection with FIGS. 5 and/or 8.

FIG. 5 is a flow diagram illustrating an example wireless display video decoding process 500, arranged in accordance with at least some implementations of the present disclosure. Process 500 may include one or more operations, functions or actions as illustrated by one or more of operations 502, etc.

Process 500 may begin at operation 502, "RECEIVE A COMPRESSED VIDEO STREAM INCLUDING AT LEAST ONE COMPRESSED ON SCREEN DISPLAY IMAGE ASSOCIATED WITH DYNAMIC MACROBLOCK LOCATION DATA", where a compressed video stream including at least one compressed On Screen Display image associated with dynamic macroblock location data may be received. For example, a compressed video stream including at least one compressed On Screen Display image associated with dynamic macroblock location data may be received via an On Screen Display management module. In some implementations, the dynamic macroblock location data may provide indicia of where dynamic content may be added to the otherwise static content of the compressed On Screen Display image.

Process 500 may continue at operation 504, "RECEIVE NON-COMPRESSED DYNAMIC CONTENT ASSOCIATED WITH THE ON SCREEN DISPLAY IMAGE", where non-compressed dynamic content associated with the On Screen Display image may be received. For example, non-compressed dynamic content associated with the On Screen Display image may be received via the On Screen Display management module.

Process 500 may continue at operation 506, "COMBINE THE NON-COMPRESSED DYNAMIC CONTENT INTO THE COMPRESSED ON SCREEN DISPLAY VIDEO STREAM", where the non-compressed dynamic content may be combined into the compressed On Screen Display video stream. For example, the non-compressed dynamic content may be combined into the compressed On Screen Display video stream via the On Screen Display management module. In some implementations, the non-compressed dynamic content may be combined into the compressed On Screen Display video stream as non-compressed intra pulse code modulation macroblocks associated with the compressed On Screen Display image based at least in part on the dynamic macroblock location data.

Process 500 may continue at operation 508, "DECOMPRESS THE COMBINED COMPRESSED ON SCREEN DISPLAY IMAGE AND NON-COMPRESSED DYNAMIC CONTENT", where the combined compressed On Screen Display image and non-compressed dynamic content may be decompressed. For example, the combined compressed On Screen Display image and non-compressed dynamic content may be decompressed via a decoder.

In some implementations, such dynamic content can be generated by using I_PCM macro blocks (MBs) in the stream fed to the decoder. An I_PCM MB may contain uncompressed pixel values. This may allow software (SW) to easily render the required dynamic content. In some implementations, in order to simplify the process, glyphs containing letters and numbers may be stored as I_PCM MBs. For example, each glyph may be built out of a matrix of 2 by 3 I_PCM MBs. Software (SW) may then assemble the glyphs in the correct order according to the content to be displayed.

Process 500 may continue at operation 510, "DISPLAY THE DECOMPRESSED ON SCREEN DISPLAY IMAGE OF THE ON SCREEN DISPLAY USER INTERFACE INCLUDING THE STATIC CONTENT AS WELL AS THE DYNAMIC CONTENT", where the decompressed On Screen Display image of the On Screen Display user interface including the static content as well as the dynamic content may be displayed. For example, the decompressed On Screen Display image of the On Screen Display user interface including the static content as well as the dynamic content may be displayed via a monitor.

Process 500 may provide for video coding, such as video encoding, decoding, and/or bitstream transmission techniques, which may be employed by a coder system as discussed herein.

Some aspects of process 500 are discussed in greater detail below in connection with FIG. 8.

Figure 6:
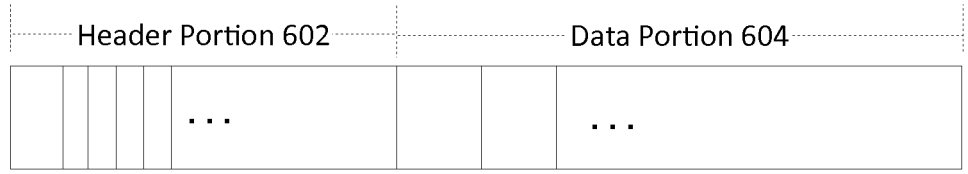
FIG. 6 illustrates an example bitstream.

FIG. 6 illustrates an example bitstream 600, arranged in accordance with at least some implementations of the present disclosure. In some examples, bitstream 600 may correspond to bitstream 111 (see, e.g., as shown in FIG. 1) output from coder 100 and/or a corresponding input bitstream to a decoder. Although not shown in FIG. 6 for the sake of clarity of presentation, in some examples bitstream 600 may include a header portion 602 and a data portion 604. In various examples, bitstream 600 may include data, indicators, index values, mode selection data, or the like associated with encoding a video frame as discussed herein. As discussed, bitstream 600 may be generated by an encoder and/or received by a decoder for decoding such that decoded video frames may be presented via a display device.

Figure 7:
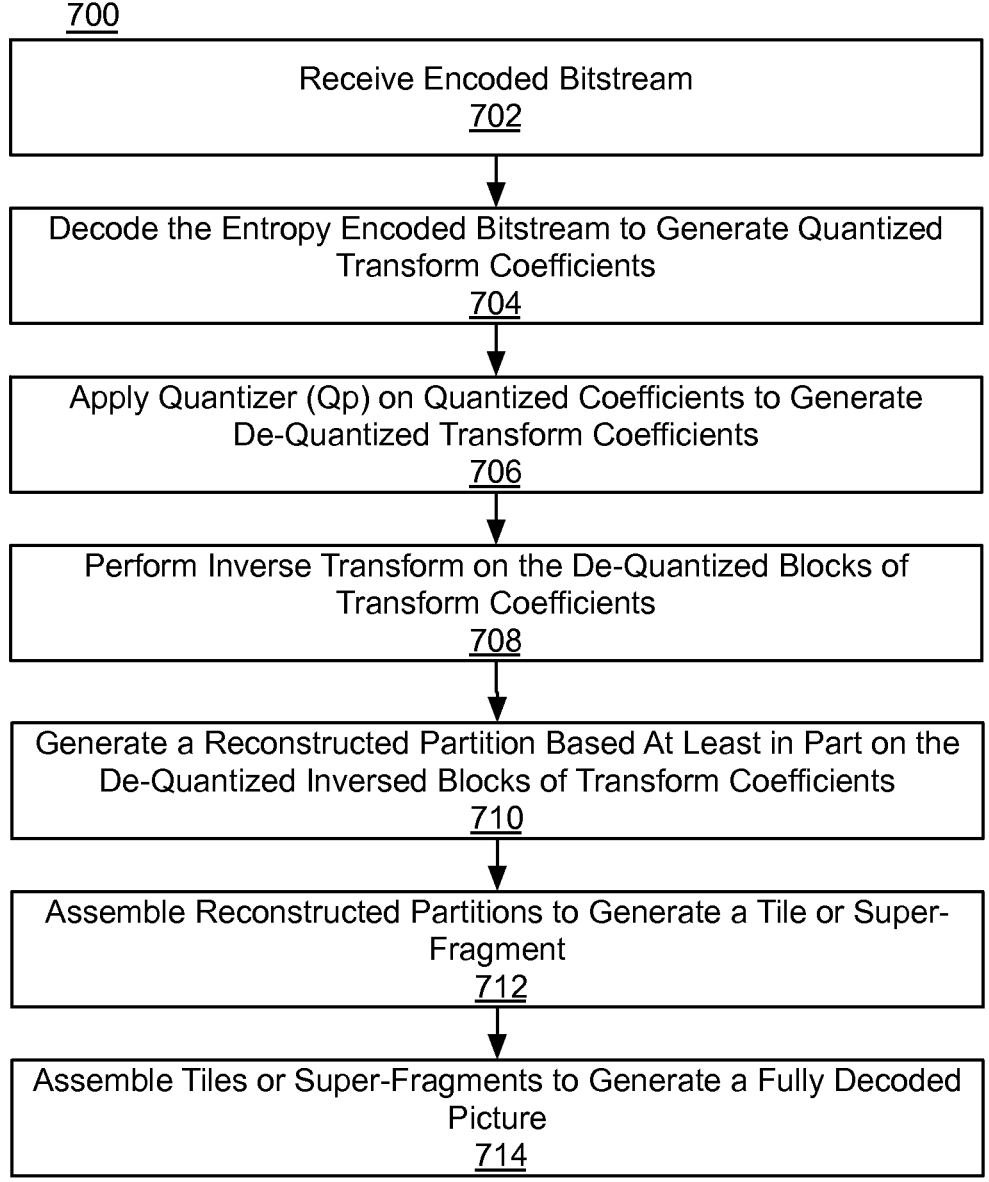
FIG. 7 is a flow diagram illustrating an example decoding process.

FIG. 7 is a flow diagram illustrating an example decoding process 700, arranged in accordance with at least some implementations of the present disclosure. Process 700 may include one or more operations, functions or actions as illustrated by one or more of operations 702, etc. Process 700 may form at least part of a video coding process. By way of non-limiting example, process 700 may form at least part of a video decoding process as might be undertaken by the internal decoder loop of coder system 100 of FIG. 1 or a decoder system (not illustrated) of the same or similar design.

Process 700 may begin at operation 702, "Receive Encoded Bitstream", where a bitstream of a video sequence may be received. For example, a bitstream encoded as discussed herein may be received at a video decoder.

Process 700 may continue at operation 704, "Decode the Entropy Encoded Bitstream to Generate Quantized Transform Coefficients", where the bitstream may be decoded to generate quantized transform coefficients. In some examples, the decoded data may include to coding partition indicators, block size data, transform type data, quantizer (Qp), quantized transform coefficients, the like, and/or combinations thereof.

Process 700 may continue at operation 706, "Apply Quantizer (Qp) on Quantized Coefficients to Generate a De-Quantized Block of Transform Coefficients", where a quantizer (Qp) may be applied to quantized transform coefficients to generate a de-quantized block of transform coefficients.

Process 700 may continue at operation 708, "Perform Inverse Transform On the De-Quantized Blocks of Transform Coefficients", where, an inverse transform may be performed on each de-quantized block of transform coefficients. For example, performing the inverse transform may include an inverse transform process similar to or the same as the inverse of any forward transform used for encoding as discussed herein.

Process 700 may continue at operation 710, "Generate a Reconstructed Partition based at least in part on the De-Quantized and Inversed Blocks of Transform Coefficients", where a reconstructed prediction partition may be generated based at least in part on the de-quantized and inversed block of transform coefficients. For example, a prediction partition may be added to the decoded prediction error data partition, which is represented by a given de-quantized and inversed block of transform coefficients, to generate a reconstructed prediction partition.

Process 700 may continue at operation 712, "Assemble Reconstructed Partitions to Generate a Tile or Super-Fragment", where the reconstructed prediction partitions may be assembled to generate a tile or super-fragment. For example, the reconstructed prediction partitions may be assembled to generate tiles or super-fragments.

Process 700 may continue at operation 714, "Assemble Tiles or Super-Fragments Generate a Fully Decoded Picture", where the tiles or super-fragments of a picture may be assembled (and/or further processed) to generate a fully decoded picture. For example, after optional filtering (e.g., deblock filtering, quality restoration filtering, and/or the like), tiles or super-fragments may be assembled to generate a full decoded picture, which may be stored via a decoded picture buffer (not shown) and/or transmitted for presentment via a display device after picture reorganization.

Some additional and/or alternative details related to process 500, 700 and other processes discussed herein may be illustrated in one or more examples of implementations discussed herein and, in particular, with respect to FIG. 8 below.

Figure 8:
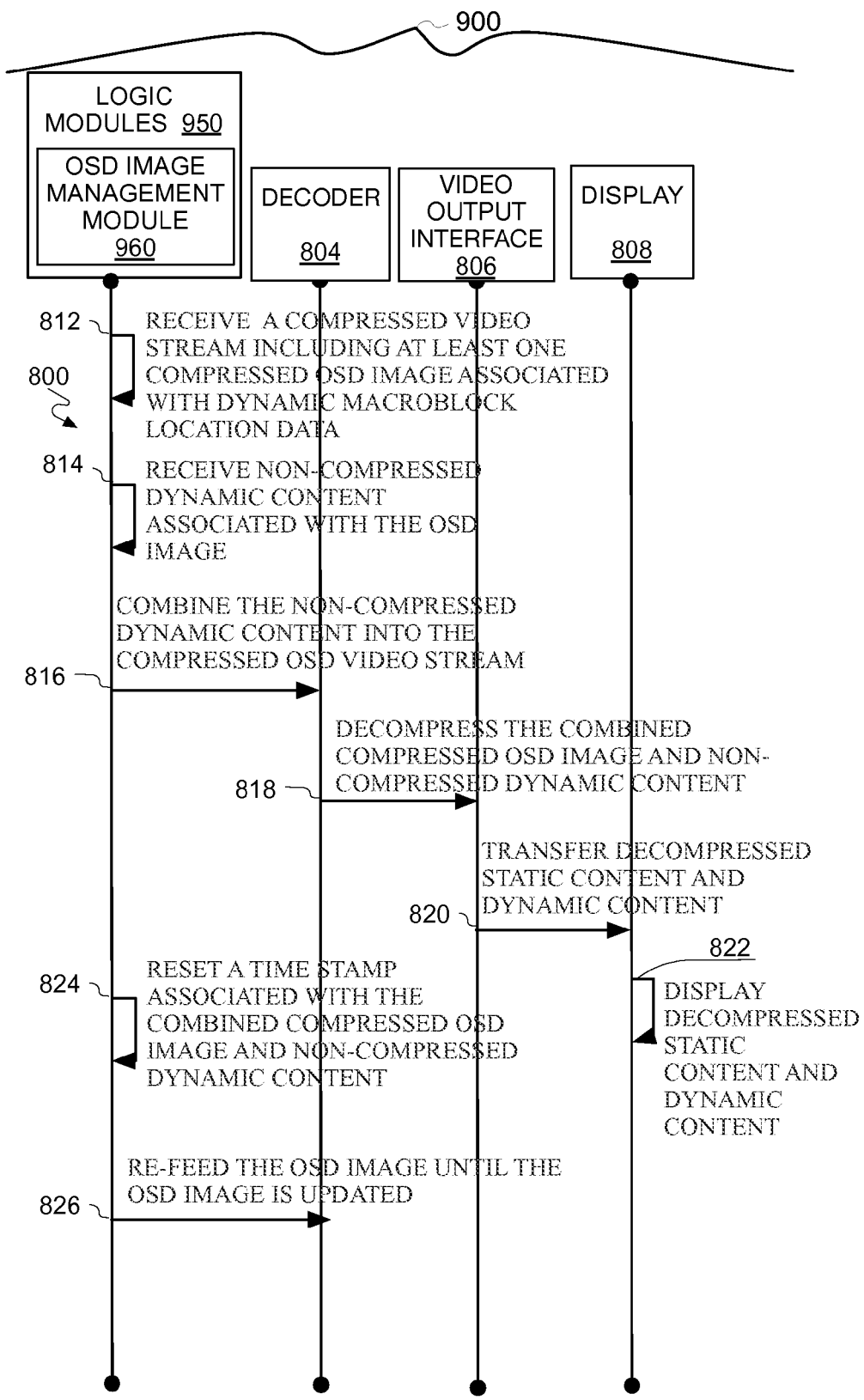
FIG. 8 provides an illustrative diagram of an example video coding system and video coding process in operation.

FIG. 8 provide an illustrative diagram of an example video coding system 900 (see, e.g., FIG. 9 for more details) and wireless display video decoding process 800 in operation, arranged in accordance with at least some implementations of the present disclosure. In the illustrated implementation, process 800 may include one or more operations, functions or actions as illustrated by one or more of actions 812, etc.

By way of non-limiting example, process 800 will be described herein with reference to example video coding system 900 including coder 100 of FIG. 1, as is discussed further herein below with respect to FIG. 9. In various examples, process 800 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

As illustrated, video coding system 900 (see, e.g., FIG. 9 for more details) may include logic modules 950. For example, logic modules 950 may include any modules as discussed with respect to any of the coder systems or subsystems described herein.

For example, logic modules 950 may include an OSD image management module 960 and/or the like.

Process 800 may begin at operation 812, "RECEIVE A COMPRESSED VIDEO STREAM INCLUDING AT LEAST ONE COMPRESSED OSD IMAGE ASSOCIATED WITH DYNAMIC MACROBLOCK LOCATION DATA", where a compressed video stream including at least one compressed On Screen Display image associated with dynamic macroblock location data may be received. For example, a compressed video stream including at least one compressed On Screen Display image associated with dynamic macroblock location data may be received via an On Screen Display management module 960. In some implementations, the dynamic macroblock location data may provide indicia of where dynamic content may be added to the otherwise static content of the compressed On Screen Display image.

In some implementations, there could be cases where the entire OSD image is static (e.g. a boot screen of a wireless dock, showing "welcome to wireless docking", or the like). In such implementations, having dynamic macroblock location data may be optional.

Video decoders typically expect a stream of packets, corresponding to a sequence of video frames. For example, a stream of packets corresponding to a sequence of OSD video frames may be received. In some implementations described herein, a compressed packet stream, which may correspond to a single video frame, (e.g., the OSD image to be shown) may be created offline for static (fixed) content.

In order to repetitively display the same OSD image, the following steps may be performed via a coder, such as a decoder or a decoder portion of an encoder.

Process 800 may continue at operation 814, "RECEIVE NON-COMPRESSED DYNAMIC CONTENT ASSOCIATED WITH THE OSD IMAGE", where non-compressed dynamic content associated with the On Screen Display image may be received. For example, non-compressed dynamic content associated with the On Screen Display image may be received via the On Screen Display management module 960.

Process 800 may continue at operation 816, "COMBINE THE NON-COMPRESSED DYNAMIC CONTENT INTO THE COMPRESSED ON SCREEN DISPLAY VIDEO STREAM", where the non-compressed dynamic content may be combined into the compressed On Screen Display image. For example, the non-compressed dynamic content may be combined into the compressed On Screen Display video stream via the On Screen Display management module 960. In some implementations, the non-compressed dynamic content may be combined into the compressed On Screen Display video stream as non-compressed intra pulse code modulation macroblocks based at least in part on the dynamic macroblock location data.

In some implementations, the dynamic, content (which may be uncompressed in some implementations) may need to be rendered in some way and then combined into a single stream which will be fed into the video decoder. A display engine may not be required. For example, a display engine would typically be used for handling uncompressed pixels, however, some implementations here may avoid using a display engine as well as the frame buffer used by such a display engine.

Process 800 may continue at operation 818, "DECOMPRESS THE COMBINED COMPRESSED ON SCREEN DISPLAY IMAGE AND NON-COMPRESSED DYNAMIC CONTENT", where the combined compressed On Screen Display image and non-compressed dynamic content may be decompressed. For example, the combined compressed On Screen Display image and non-compressed dynamic content may be decompressed via a decoder 804.

Process 800 may continue at operation 820, "TRANSFER DECOMPRESSED STATIC CONTENT AND DYNAMIC CONTENT", where the decompressed On Screen Display image of the On Screen Display user interface may be transferred. For example, the decompressed On Screen Display image of the On Screen Display user interface may be transferred from the decoder 804 to monitor 808 via a video output interface 806. In some implementations, the decompressed On Screen Display image of the On Screen Display user interface may be output from the decoder 804 to the monitor 808 via video output interface 806 (e.g. HDMI or the like) without using a frame buffer.

In such implementations, video coding system 900 may include an architecture where there is no frame buffer. Instead, decoded pixels showing the OSD message maybe directly output to the video output interface 806. Eliminating the frame buffer may reduce product development time and cost associated with the external memory chip which typically stores the frame buffer (and which may be too large to be stored on-die).

Process 800 may continue at operation 822, "DISPLAY DECOMPRESSED STATIC CONTENT AND DYNAMIC CONTENT T", where the decompressed On Screen Display image of the On Screen Display user interface including the static content as well as the dynamic content may be displayed. For example, the decompressed On Screen Display image of the On Screen Display user interface including the static content as well as the dynamic content may be displayed via monitor 808 (e.g., computer display, monitor, television, the like and/or combinations thereof).

For example, in some cases it may be necessary to display dynamic content (e.g., content which can be generated only during system run time) via display 808. An example is a PIN code used for authentication between wireless docking sources and sinks.

In some implementations, such content can be generated by using I_PCM macro blocks (MBs) in the stream fed to the decoder. An I_PCM MB may contain uncompressed pixel values. This may allow software (SW) to easily render the required dynamic content. In some implementations, in order to simplify the process, glyphs containing letters and numbers may be stored as I_PCM MBs. For example, each glyph may be built out of a matrix of 2 by 3 I_PCM MBs. Software (SW) may then assemble the glyphs in the correct order according to the content to be displayed.

Process 800 may continue at operation 824, "RESET A TIME STAMP ASSOCIATED WITH THE COMBINED COMPRESSED OSD IMAGE AND NON-COMPRESSED DYNAMIC CONTENT", where a time stamp associated with the combined compressed On Screen Display image and non-compressed dynamic content may be reset. For example, a time stamp associated with the combined compressed On Screen Display image and non-compressed dynamic content may be reset via the On Screen Display management module 960.

Additionally or alternatively, the decoder 804 may be modified so as to be configured to ignore improper time stamps associated with the combined compressed On Screen Display image and non-compressed dynamic content.

As will be described below, OSD image decoder module 960 may re-feed the packet stream to the decoder 804. In such an example, for a typical video decoder, it may be necessary to update the presentation time carried in the stream, so the decoder will be willing to re-decode the same packets and display the same image again. Accordingly, process 800 may reset (e.g., increment) packet sequence numbers in order to fool the decoder to think new packets arrived. Additionally or alternatively, process 800 may include the decoder 804 being modified in order to accept packets whose presentation time is in the past.

Process 800 may continue at operation 826, "RE-FEED THE OSD IMAGE UNTIL THE OSD IMAGE IS UPDATED", where the compressed On Screen Display image may be re-fed back to the decoder for repeated decoding until the OSD image is updated. For example, the compressed On Screen Display image may be re-fed back to the decoder 804 via the On Screen Display management module 960 for repeated decoding until the OSD image is updated. In some conditions, the compressed On Screen Display image (e.g., even without dynamic content) may be re-fed back to the decoder 804 via the On Screen Display management module 960 for repeated decoding until the On Screen Display user interface changes images. In other conditions, the compressed On Screen Display image (e.g., as the combined compressed OSD image and non-compressed dynamic content) may be re-fed back to the decoder 804 via the On Screen Display management module 960 for repeated decoding until the On Screen Display user interface changes images.

In operation, after the decoder reads all of the packets, the packet stream may be fed again to the decoder via OSD image decoder module 960. For example, the packet stream may be re-fed into the decoder 804 in a repetitive loop via OSD image decoder module 960.

Otherwise, when it is time to display a different OSD image, a new packet stream corresponding to the new image may replace the first packet stream, and re-decoding in a loop may resume via OSD image decoder module 960.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated. Additionally, although one particular set of blocks or actions is illustrated as being associated with particular modules, these blocks or actions may be associated with different modules than the particular modules illustrated here.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 5, 7, and 8 in response to instructions conveyed to the processor by a computer readable medium.

Figure 9:
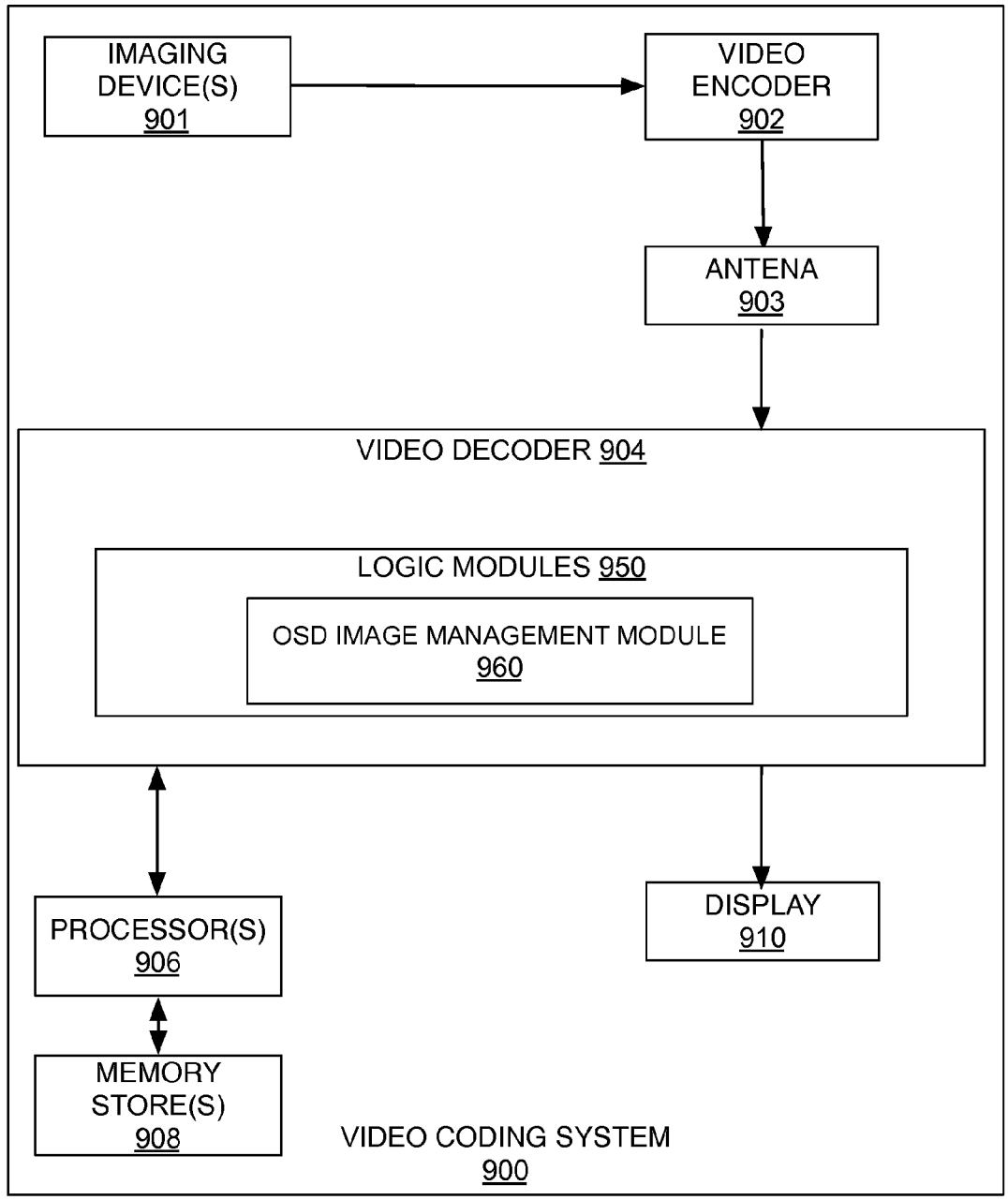
FIG. 9 is an illustrative diagram of an example video coding system.

FIG. 9 is an illustrative diagram of example video coding system 900, arranged in accordance with at least some implementations of the present disclosure. In the illustrated implementation, video coding system 900, although illustrated with both video encoder 902 and video decoder 904, video coding system 900 may include only video encoder 902 or only video decoder 904 in various examples. Video coding system 900 (which may include only video encoder 902 or only video decoder 904 in various examples) may include imaging device(s) 901, an antenna 903, one or more processor(s) 906, one or more memory store(s) 908, and/or a display device 910. As illustrated, imaging device(s) 901, antenna 903, video encoder 902, video decoder 904, processor(s) 906, memory store(s) 908, and/or display device 910 may be capable of communication with one another.

In some implementations, video coding system 900 may include antenna 903. For example, antenna 903 may be configured to transmit or receive an encoded bitstream of video data, for example. Processor(s) 906 may be any type of processor and/or processing unit. For example, processor(s) 906 may include distinct central processing units, distinct graphic processing units, integrated system-on-a-chip (SoC) architectures, the like, and/or combinations thereof. In addition, memory store(s) 908 may be any type of memory. For example, memory store(s) 908 may be volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 908 may be implemented by cache memory. Further, in some implementations, video coding system 900 may include display device 910. Display device 910 may be configured to present video data.

As shown, in some examples, video coding system 900 may include logic modules 950. While illustrated as being associated with video decoder 904, video encoder 902 may similarly be associated with identical and/or similar logic modules as the illustrated logic modules 950. Accordingly, video decoder 904 may include all or portions of logic modules 950. For example, antenna 903, video decoder 904, processor(s) 906, memory store(s) 908, and/or display 910 may be capable of communication with one another and/or communication with portions of logic modules 950. Similarly, video encoder 902 may include identical and/or similar logic modules to logic modules 950. For example, imaging device(s) 901 and video encoder 902 may be capable of communication with one another and/or communication with logic modules that are identical and/or similar to logic modules 950.

In some implementations, logic modules 950 may embody various modules as discussed with respect to any system or subsystem described herein. In various embodiments, some of logic modules 950 may be implemented in hardware, while software may implement other logic modules. For example, in some embodiments, some of logic modules 950 may be implemented by application-specific integrated circuit (ASIC) logic while other logic modules may be provided by software instructions executed by logic such as processors 906. However, the present disclosure is not limited in this regard and some of logic modules 950 may be implemented by any combination of hardware, firmware and/or software.

For example, logic modules 950 may include an OSD image decoder module 960 and/or the like.

Figure 10:
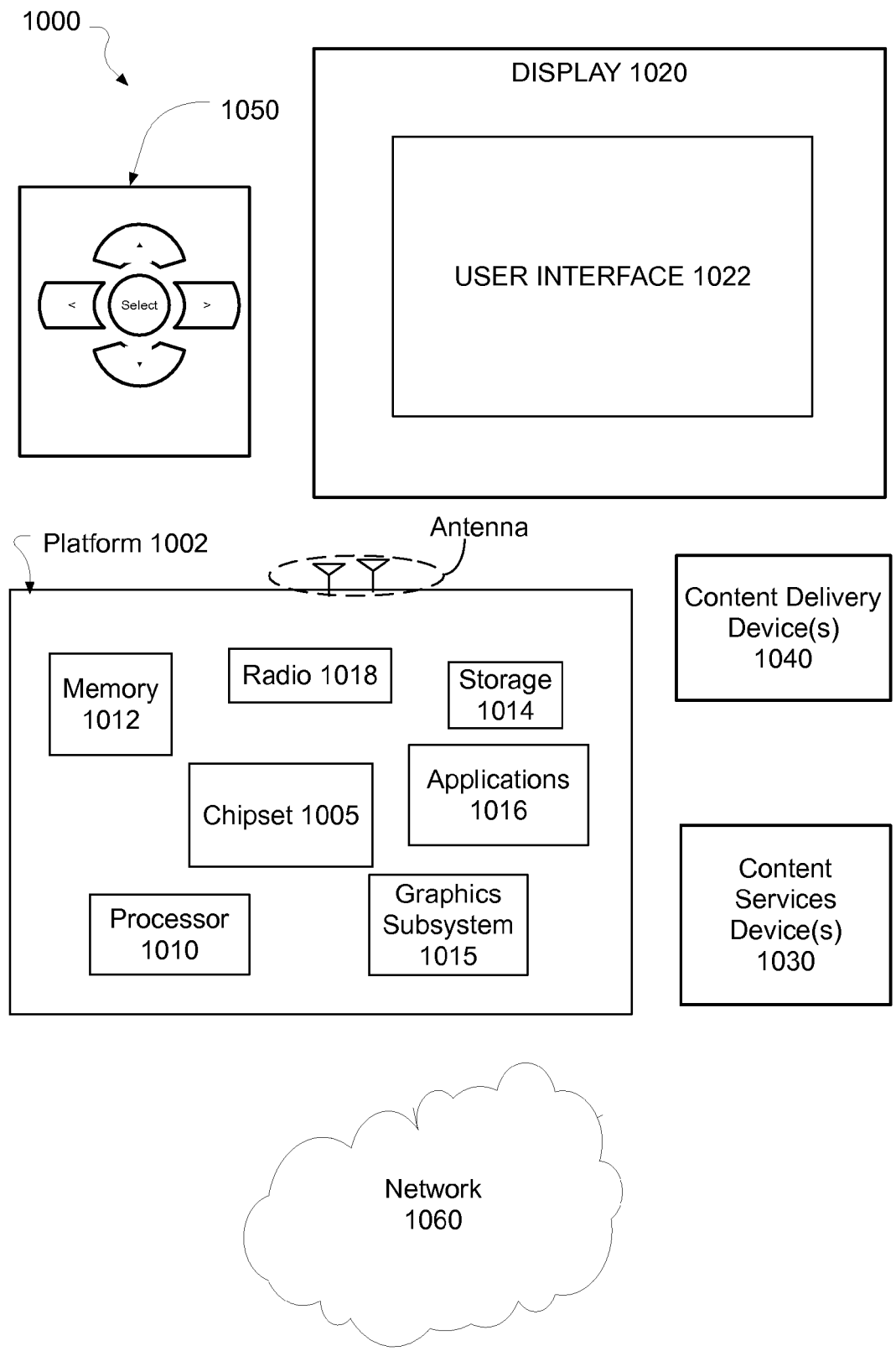
FIG. 10 is an illustrative diagram of an example system.

FIG. 10 is an illustrative diagram of an example system 1000, arranged in accordance with at least some implementations of the present disclosure. In various implementations, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022. In various embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for (5.1) surround sound audio and/or high definition (7.1) surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
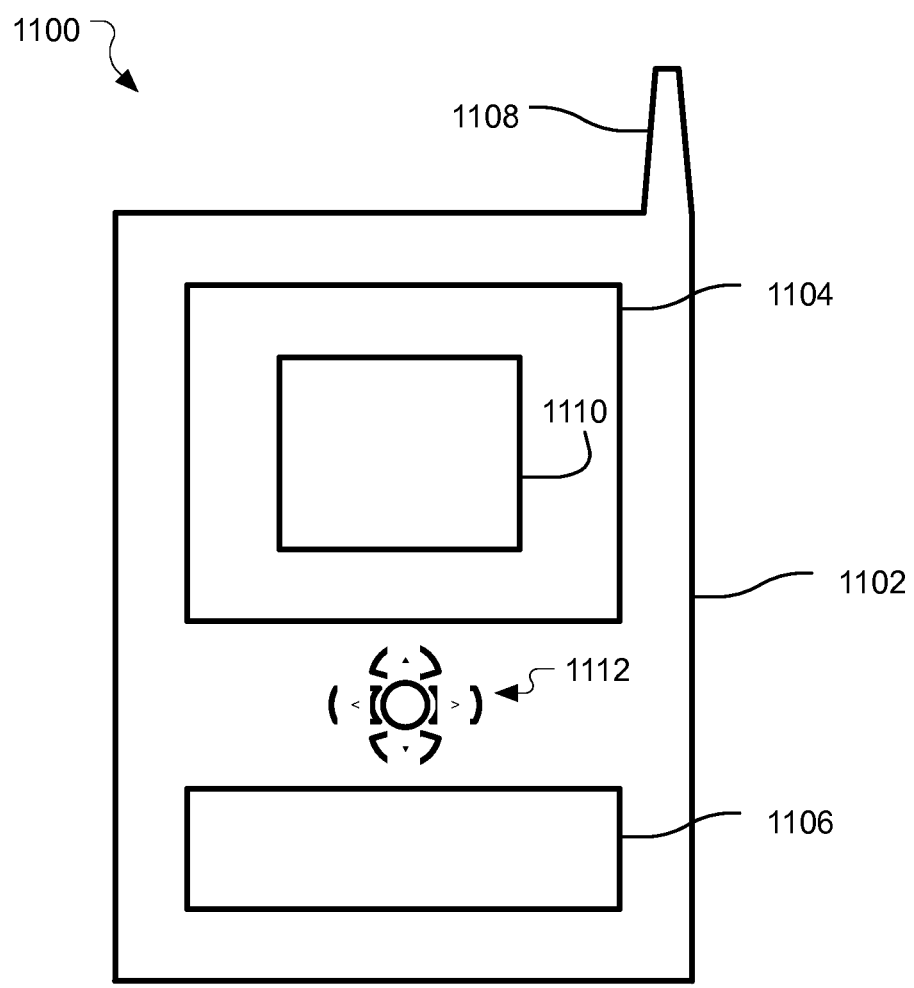
FIG. 11 is an illustrative diagram of an example system, all arranged in accordance with at least some implementations of the present disclosure.

As described above, system 1000 may be embodied in varying physical styles or form factors. FIG. 11 illustrates implementations of a small form factor device 1100 in which system 1100 may be embodied. In various embodiments, for example, device 1100 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing 1102, a display 1104 which may include a user interface 1110, an input/output (I/O) device 1106, and an antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, image sensors, and so forth. Information also may be entered into device 1100 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems as discussed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for wireless display video decoding may include receiving, via an On Screen Display management module, a compressed video stream including at least one compressed On Screen Display image associated with dynamic macroblock location data, where the dynamic macroblock location data provides an indicia of where dynamic content may be added to the otherwise static content of the compressed On Screen Display image. The On Screen Display management module may receive non-compressed dynamic content associated with the On Screen Display image. The On Screen Display management module may the non-compressed dynamic content into the compressed On Screen Display video stream as non-compressed intra pulse code modulation macroblocks associated with the compressed On Screen Display image based at least in part on the dynamic macroblock location data. A decoder may decompress the combined compressed On Screen Display image and non-compressed dynamic content. A monitor may display the decompressed On Screen Display image of the On Screen Display user interface including the static content as well as the dynamic content.

In another example, a computer-implemented method for wireless display video decoding may further include resetting, via the On Screen Display management module, a time stamp associated with the combined compressed On Screen Display image and non-compressed dynamic content. The On Screen Display management module may refeed the combined compressed On Screen Display image and non-compressed dynamic content back to the decoder for repeated decoding until the On Screen Display user interface changes images. The decoder may ignore improper time stamps associated with the combined compressed On Screen Display image and non-compressed dynamic content. The decompressed On Screen Display image of the On Screen Display user interface may be output from the decoder to the monitor via a video output interface without using a frame buffer.

In other examples, a system for video decoding wireless display may include an On Screen Display management module configure to: receive a compressed video stream including at least one compressed On Screen Display image associated with dynamic macroblock location data, where the dynamic macroblock location data provides an indicia of where dynamic content may be added to the otherwise static content of the compressed On Screen Display image, receive non-compressed dynamic content associated with the On Screen Display image, and combine the non-compressed dynamic content into the compressed On Screen Display video stream as non-compressed intra pulse code modulation macroblocks associated with the compressed On Screen Display image based at least in part on the dynamic macroblock location data. A decoder may be in communication with the On Screen Display management module. The decoder may be configured to decompress the combined compressed On Screen Display image and non-compressed dynamic content. A monitor may be in communication with the decoder. The monitor may be configured to display the decompressed On Screen Display image of the On Screen Display user interface including the static content as well as the dynamic content.

In another example, the system for video decoding wireless display may further include the On Screen Display management module being further configured to reset a time stamp associated with the combined compressed On Screen Display image and non-compressed dynamic content. The On Screen Display management module may be further configured to reefed the combined compressed On Screen Display image and non-compressed dynamic content back to the decoder for repeated decoding until the On Screen Display user interface changes images. The decoder may be further configured to ignore improper time stamps associated with the combined compressed On Screen Display image and non-compressed dynamic content. The decompressed On Screen Display image of the On Screen Display user interface may be output from the decoder to the monitor via a video output interface without using a frame buffer.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for wireless display video decoding, comprising:
    receiving, via an On Screen Display management module, a compressed video stream including at least one compressed On Screen Display image associated with dynamic macroblock location data, wherein the dynamic macroblock location data provides an indicia of where dynamic content may be added to the otherwise static content of the compressed On Screen Display image;
    receiving, via the On Screen Display management module, non-compressed dynamic content associated with the On Screen Display image;
    combining, via the On Screen Display management module, the non-compressed dynamic content into the compressed On Screen Display video stream as non-compressed intra pulse code modulation macroblocks associated with the compressed On Screen Display image based at least in part on the dynamic macroblock location data;
    decompressing, via a decoder, the combined compressed On Screen Display image and non-compressed dynamic content; and
    displaying, via a monitor, the decompressed On Screen Display image of the On Screen Display user interface including the static content as well as the dynamic content.

2. The method of claim 1, wherein the decompressed On Screen Display image of the On Screen Display user interface is output from the decoder to the monitor via a video output interface without using a frame buffer.

3. The method of claim 1, further comprising:
    resetting, via the On Screen Display management module, a time stamp associated with the combined compressed On Screen Display image and non-compressed dynamic content.

4. The method of claim 1, further comprising:
    refeeding, via the On Screen Display management module, the combined compressed On Screen Display image and non-compressed dynamic content back to the decoder for repeated decoding until the On Screen Display user interface changes images.

5. The method of claim 1, further comprising:
    resetting, via the On Screen Display management module, a time stamp associated with the combined compressed On Screen Display image and non-compressed dynamic content; and
    refeeding, via the On Screen Display management module, the combined compressed On Screen Display image and non-compressed dynamic content back to the decoder for repeated decoding until the On Screen Display user interface changes images.

6. The method of claim 1, further comprising:
    refeeding, via the On Screen Display management module, the combined compressed On Screen Display image and non-compressed dynamic content back to the decoder for repeated decoding until the On Screen Display user interface changes images; and
    ignoring, via the decoder, improper time stamps associated with the combined compressed On Screen Display image and non-compressed dynamic content.

7. The method of claim 1, further comprising:
    resetting, via the On Screen Display management module, a time stamp associated with the combined compressed On Screen Display image and non-compressed dynamic content;
    refeeding, via the On Screen Display management module, the combined compressed On Screen Display image and non-compressed dynamic content back to the decoder for repeated decoding until the On Screen Display user interface changes images; and
    ignoring, via the decoder, improper time stamps associated with the combined compressed On Screen Display image and non-compressed dynamic content,
    wherein the decompressed On Screen Display image of the On Screen Display user interface is output from the decoder to the monitor via a video output interface without using a frame buffer.

8. A system for video decoding wireless display, comprising:
    an On Screen Display management module configure to:
        receive a compressed video stream including at least one compressed On Screen Display image associated with dynamic macroblock location data, wherein the dynamic macroblock location data provides an indicia of where dynamic content may be added to the otherwise static content of the compressed On Screen Display image,
        receive non-compressed dynamic content associated with the On Screen Display image, and
        combine the non-compressed dynamic content into the compressed On Screen Display video stream as non-compressed intra pulse code modulation macroblocks associated with the compressed On Screen Display image based at least in part on the dynamic macroblock location data;
    a decoder in communication with the On Screen Display management module, the decoder configured to decompress the combined compressed On Screen Display image and non-compressed dynamic content; and a monitor in communication with the decoder, the monitor configured to display the decompressed On Screen Display image of the On Screen Display user interface including the static content as well as the dynamic content.

9. The system of claim 8, wherein the decompressed On Screen Display image of the On Screen Display user interface is output from the decoder to the monitor via a video output interface without using a frame buffer.

10. The system of claim 8, the On Screen Display management module further configured to reset a time stamp associated with the combined compressed On Screen Display image and non-compressed dynamic content.

11. The system of claim 8, the On Screen Display management module further configured to refeed the combined compressed On Screen Display image and non-compressed dynamic content back to the decoder for repeated decoding until the On Screen Display user interface changes images.

12. The system of claim 8, the On Screen Display management module further configured to:
reset a time stamp associated with the combined compressed On Screen Display image and non-compressed dynamic content; and
reefed the combined compressed On Screen Display image and non-compressed dynamic content back to the decoder for repeated decoding until the On Screen Display user interface changes images.

13. The system of claim 8, further comprising:
the On Screen Display management module further configured to refeed the combined compressed On Screen Display image and non-compressed dynamic content back to the decoder for repeated decoding until the On Screen Display user interface changes images; and
the decoder further configured to ignore improper time stamps associated with the combined compressed On Screen Display image and non-compressed dynamic content.

14. The system of claim 8, further comprising:
the On Screen Display management module further configured to reset a time stamp associated with the combined compressed On Screen Display image and non-compressed dynamic content;
the On Screen Display management module further configured to reefed the combined compressed On Screen Display image and non-compressed dynamic content back to the decoder for repeated decoding until the On Screen Display user interface changes images; and
the decoder further configured to ignore improper time stamps associated with the combined compressed On Screen Display image and non-compressed dynamic content,
wherein the decompressed On Screen Display image of the On Screen Display user interface is output from the decoder to the monitor via a video output interface without using a frame buffer.

15. At least one machine readable medium comprising: a plurality of instructions that in response to being executed on a computing device, causes the computing device to perform:
receiving, via an On Screen Display management module, a compressed video stream including at least one compressed On Screen Display image associated with dynamic macroblock location data, wherein the dynamic macroblock location data provides an indicia of where dynamic content may be added to the otherwise static content of the compressed On Screen Display image;
receiving, via the On Screen Display management module, non-compressed dynamic content associated with the On Screen Display image;
combining, via the On Screen Display management module, the non-compressed dynamic content into the compressed On Screen Display video stream as non-compressed intra pulse code modulation macroblocks associated with the compressed On Screen Display image based at least in part on the dynamic macroblock location data;
decompressing, via a decoder, the combined compressed On Screen Display image and non-compressed dynamic content; and
displaying, via a monitor, the decompressed On Screen Display image of the On Screen Display user interface including the static content as well as the dynamic content.

16. The at least one machine readable medium method of claim 15, wherein the decompressed On Screen Display image of the On Screen Display user interface is output from the decoder to the monitor via a video output interface without using a frame buffer.

17. The at least one machine readable medium method of claim 15, further comprising:
resetting, via the On Screen Display management module, a time stamp associated with the combined compressed On Screen Display image and non-compressed dynamic content.

18. The at least one machine readable medium method of claim 15, further comprising:
refeeding, via the On Screen Display management module, the combined compressed On Screen Display image and non-compressed dynamic content back to the decoder for repeated decoding until the On Screen Display user interface changes images.

19. The at least one machine readable medium method of claim 15, further comprising:
resetting, via the On Screen Display management module, a time stamp associated with the combined compressed On Screen Display image and non-compressed dynamic content; and
refeeding, via the On Screen Display management module, the combined compressed On Screen Display image and non-compressed dynamic content back to the decoder for repeated decoding until the On Screen Display user interface changes images.

20. The at least one machine readable medium method of claim 15, further comprising:
refeeding, via the On Screen Display management module, the combined compressed On Screen Display image and non-compressed dynamic content back to the decoder for repeated decoding until the On Screen Display user interface changes images; and
ignoring, via the decoder, improper time stamps associated with the combined compressed On Screen Display image and non-compressed dynamic content.

21. The at least one machine readable medium method of claim 15, further comprising:
resetting, via the On Screen Display management module, a time stamp associated with the combined compressed On Screen Display image and non-compressed dynamic content;
refeeding, via the On Screen Display management module, the combined compressed On Screen Display image and non-compressed dynamic content back to the decoder for repeated decoding until the On Screen Display user interface changes images; and ignoring, via the decoder, improper time stamps associated with the combined compressed On Screen Display image and non-compressed dynamic content, wherein the decompressed On Screen Display image of the On Screen Display user interface is output from the decoder to the monitor via a video output interface without using a frame buffer.

* * * * *